(12) United States Patent
Block et al.

(10) Patent No.: US 7,526,549 B2
(45) Date of Patent: Apr. 28, 2009

(54) CLUSTER DATA PORT SERVICES FOR CLUSTERED COMPUTER SYSTEM

(75) Inventors: Timothy Roy Block, Rochester, MN (US); Bob Richard Cernohous, Rochester, MN (US); John Christian Unterholzner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 10/626,086

(22) Filed: Jul. 24, 2003

(65) Prior Publication Data
US 2005/0021751 A1    Jan. 27, 2005

(51) Int. Cl.
*G06F 15/173*    (2006.01)
(52) U.S. Cl. .............. 709/225; 709/105; 709/226; 709/202; 370/352; 370/389
(58) Field of Classification Search .......... 709/225, 709/105, 226, 240, 239, 202; 370/352, 389, 370/395.1
See application file for complete search history.

(56) References Cited

U.S. PATENT DOCUMENTS

| | | | | |
|---|---|---|---|---|
| 6,487,866 | B1* | 12/2002 | Fesmire et al. | 62/51.1 |
| 6,587,866 | B1* | 7/2003 | Modi et al. | 718/105 |
| 6,606,315 | B1* | 8/2003 | Albert et al. | 370/352 |
| 2002/0133594 | A1* | 9/2002 | Syvanne | 709/226 |
| 2002/0161923 | A1* | 10/2002 | Foster et al. | 709/239 |

* cited by examiner

*Primary Examiner*—Saleh Najjar
*Assistant Examiner*—Thuong (Tina) T Nguyen
(74) *Attorney, Agent, or Firm*—Wood, Herron & Evans, LLP

(57) ABSTRACT

An apparatus, program product and method utilize cluster data port services within a cluster infrastructure to provide reliable and efficient communications between nodes in a clustered computer system. The cluster data port services present an abstracted transport service that encapsulates and manages the establishment of multiple connection paths between a source node, a target node and one or more backup nodes in such a manner that a cluster data port is effectively utilized as single data port from the perspective of a user program.

34 Claims, 8 Drawing Sheets

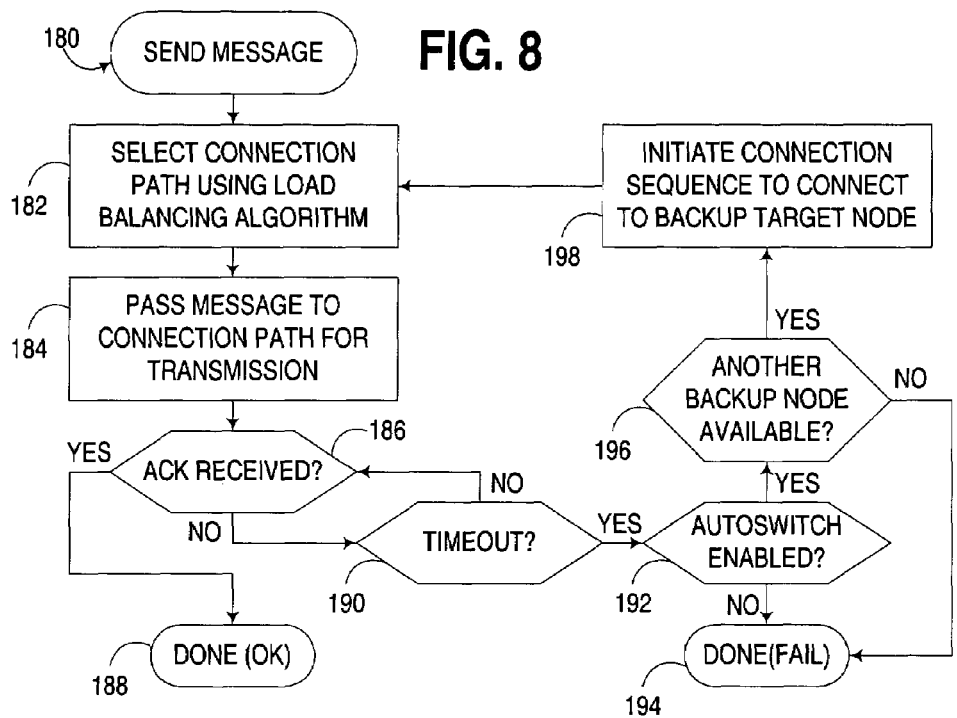
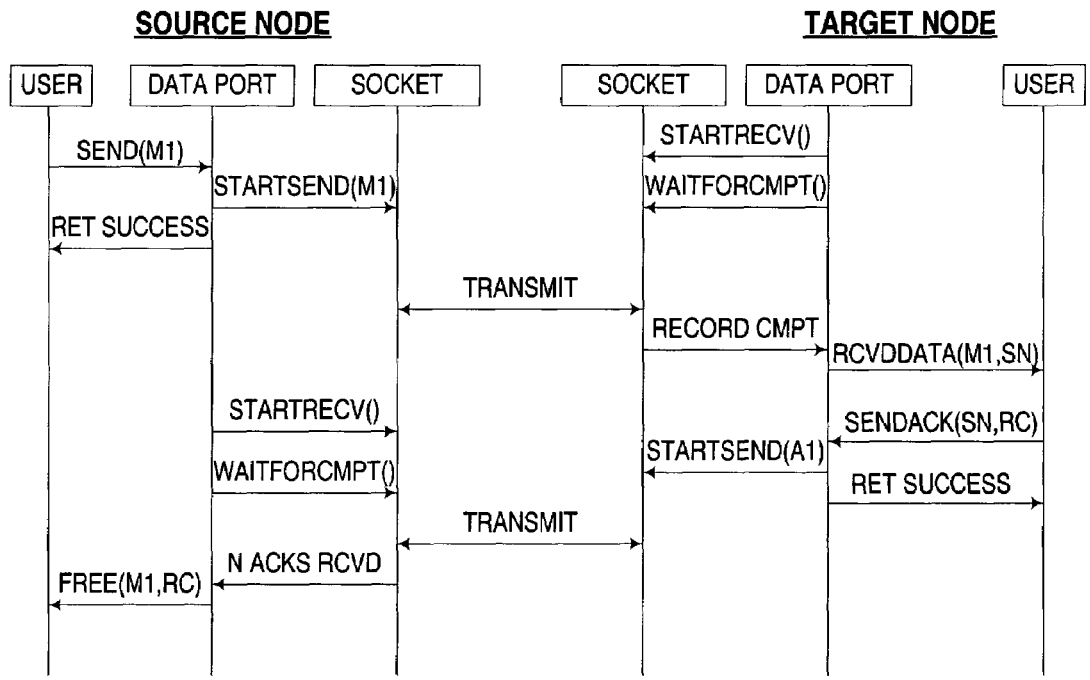

CLUSTER DATA PORT SERVICES FOR CLUSTERED COMPUTER SYSTEM

FIELD OF THE INVENTION

The invention is generally directed to clustered computer systems, and in particular, to data transfer between nodes in clustered computer systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group. Typically, these jobs, which are often referred to as "members," are resident on different nodes in a cluster.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Communication between programs executing on different nodes in a conventional clustered computer system is often established at a user level (from the perspective of the clustering infrastructure), i.e., under the direction of program code that sits on top of and relies on the underlying services provided by the clustering infrastructure—typically a program or module in an operating system or kernel, or an application program. Put another way, when a "user" program such as an application program or a kernel or operating system program executing on one node of a clustered computer system needs to transmit data to another node in the clustered computer system, the user program itself is often required to initiate the establishment of a network connection with the other node, as well as manage the transmission and reception of data over the established network connection. Data transfer occurs to the other node via the single established network connection.

One drawback to this mechanism of data transfer in a clustered computer system, however, is that the user program itself is typically required to handle failure events, such as the unavailability of a node to which the user program is attempting to send data. In the event of a node failure, for example, a user program may be required to redirect its data flow to a backup node by establishing a new network connection to the backup node.

Consistent with the overall goals of most clustered computer systems, particularly those utilized in high availability applications, it is desirable for functionality such as failover, load balancing and other high availability techniques to be handled within the cluster infrastructure, rather than in user program code, thus reducing or eliminating the need for user program developers to specifically configure a user program to address clustering-related reliability and performance concerns.

As a result, requiring a user program to manage node failures in connection with communicating data between nodes in a clustered computer system is antithetical to the design goals of most clustered computer systems. A need therefore exists for a manner of facilitating the reliable and efficient communication of data between the nodes of a clustered computer system with reduced reliance on specific user program support therefor.

SUMMARY OF THE INVENTION

The invention addresses these and other problems associated with the prior art in providing an apparatus, program product and method that utilize cluster data port services within a cluster infrastructure to provide reliable and efficient communications between nodes in a clustered computer system. In particular, cluster data port services consistent with the invention present an abstracted transport service that encapsulates and manages the establishment of multiple network connections between a source node, a target node and one or more backup nodes in such a manner that a cluster data port is effectively utilized as a single data port from the perspective of a user program.

A cluster data port consistent with the invention supports both the ability to select among a plurality of connection paths between a source node and a target node, and the ability to selectively switch over data flow from a target node to a backup target node. In some embodiments consistent with the invention, the failure of a given connection path, or alternatively, the failure of a given target node, may be rectified by such a cluster data port, often in a manner that is effectively hidden from any user programs that utilize the service, or in the least, in a manner that such user programs are freed from having to be involved in managing the underlying communication layer protocols. Furthermore, in other embodiments, additional functions, such as load balancing, multiple send models, and message encryption, among others, may also be supported.

Among other applications, a cluster data port consistent with the invention may be used to facilitate the transfer of large volumes of data between a source node and specified target nodes in a clustering environment, e.g., for the purpose of supporting mirroring between production and copy disks, even when such disks are installed at geographically remote locations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a flowchart illustrating the program flow for a send message routine executed by the cluster data port services referenced in FIG. 3.

FIG. 9 is a flowchart illustrating normal synchronous message flow in the cluster data port services referenced in FIG. 3.

DETAILED DESCRIPTION

The embodiments described hereinafter utilize cluster data port services within a cluster infrastructure to provide an abstracted transport service suitable for encapsulating and managing the establishment of multiple network connections between a source node, a target node and one or more backup nodes in such a manner that a cluster data port is effectively utilized as single data port from the perspective of a user program.

Figure 1:
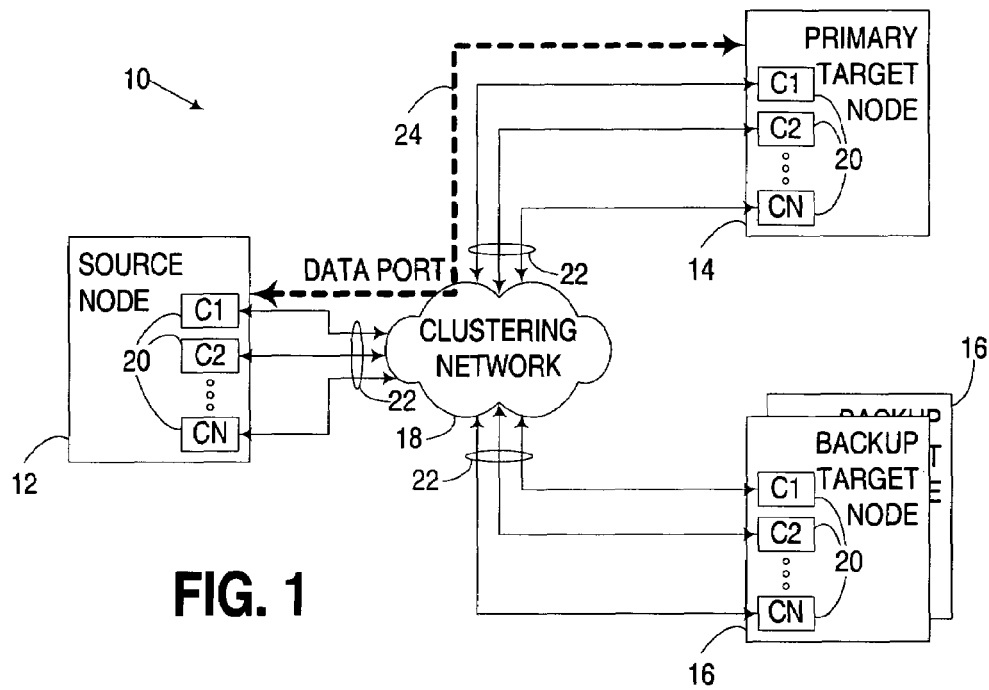
FIG. 1 is a block diagram of a clustered computer system consistent with the invention, and illustrating a cluster data port consistent with the invention.

Turning now to the Drawings, wherein like numbers denote like parts throughout the several views, FIG. 1 illustrates an exemplary clustered computer system 10 including a plurality of nodes interconnected with one another in a distributed manner, e.g., a source node 12, primary target node 14 and plurality of backup target nodes 16.

As is well known in the art, a clustering infrastructure (not shown in FIG. 1) is typically distributed among all such nodes, facilitating the distributed performance of cluster-related tasks, including the herein-described cluster data port services. Each node of a cluster may include the same clustering infrastructure program code, or different nodes may include clustering infrastructure program code that differs from other nodes, so long as the program code collectively resident on all nodes is capable of managing cluster data port services in the manner described herein.

Nodes 12, 14 and 16 are typically coupled together via a clustering network 18, which may include practically any network topology, including various configurations of local area networks (LANs), high speed interconnects such as Infiniband and Remote Input/Output (RIO), wide area networks (WANs), etc., as well as combinations thereof. It will also be appreciated that individual nodes 12, 14, 16 may be physically located in close proximity with other nodes, or may be geographically separated from other nodes, as is well known in the art. Moreover, wide variety of interconnection types, network types, node types, etc., may be permitted to coexist with one another in an efficient and reliable manner in clustered computer system 10.

Additionally disposed in each node 12, 14, 16 is one or more network connections 20 that couple the respective node to clustering network 18 via connection paths 22. The network connections 20, for example, may represent individual network adapter cards, or different ports on the same card should multiple ports be provided on a card, so long as each connection 20 is provided with a separate connection path 22 to network 18. As will become more apparent below, by providing multiple connection paths 22 from a node 12, 14, 16 to network 18, multiple logical connections may be made between any pair of nodes, enabling both connection redundancy and failover (to recover from a failed connection), and optionally load balancing (to provide higher overall throughput), to be provided for each node in the clustered computer system.

A cluster data port consistent with the invention is diagrammatically represented at 24 in FIG. 1, providing logical communication between source node 12 and primary target node 14. A cluster data port consistent with the invention principally supports the ability to selectively and dynamically choose among a plurality of connection paths 22 between source node 12 and any of nodes 14, 16, as well as the ability to selectively and dynamically switch over data flow from primary target node 14 to a backup primary node 16, effectively substituting the backup target node 16 as the new primary target node. As such, a cluster data port consistent with the invention is often capable of supporting redundancy both from the standpoint of the connection paths available between the source node and a target node, and the standpoint of the nodes that are capable of serving as target nodes for the data port.

Figure 2:
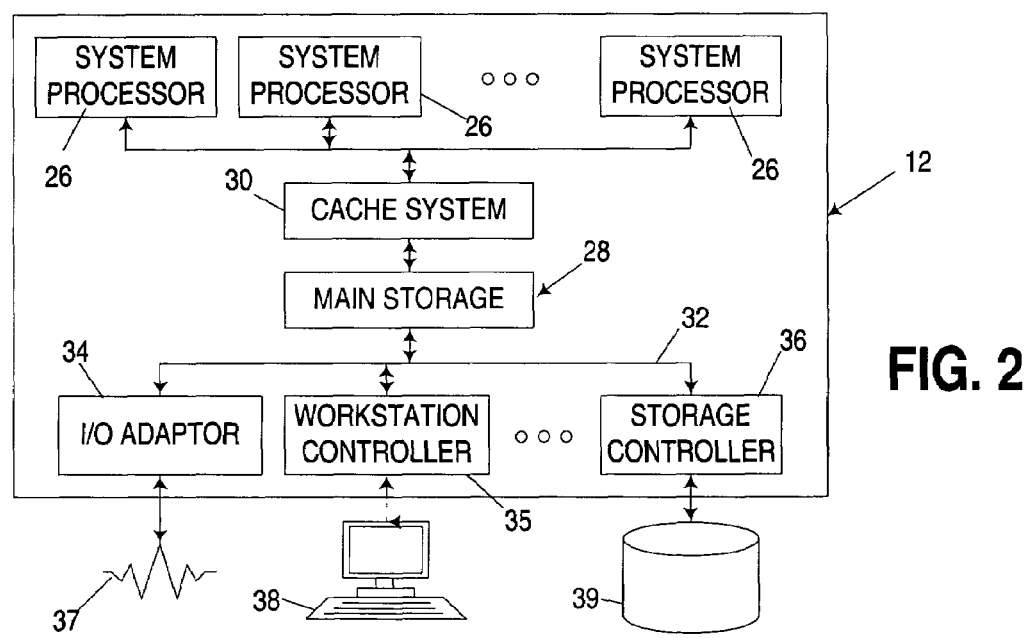
FIG. 2 is a block diagram of a node in the clustered computer system of FIG. 1.

Now turning to FIG. 2, an exemplary hardware configuration for source node 12 in clustered computer system 10 is shown. It will be appreciated that nodes 14, 16 may be similarly configured, or may use a different hardware configuration. Node 12 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Node 12 generally includes one or more system processors 26 coupled to a main storage 28 through one or more levels of cache memory disposed within a cache system 30. Furthermore, main storage 28 is coupled to a number of types of external devices via a system input/output (I/O) bus 32 and a plurality of interface devices, e.g., an input/output adaptor 34, a workstation controller 35 and a storage controller 36, which respectively provide external access to one or more external networks 37, one or more workstations 38, and/or one or more storage devices such as a direct access storage device (DASD) 39. Any number of alternate computer architectures may be used in the alternative.

Figure 3:
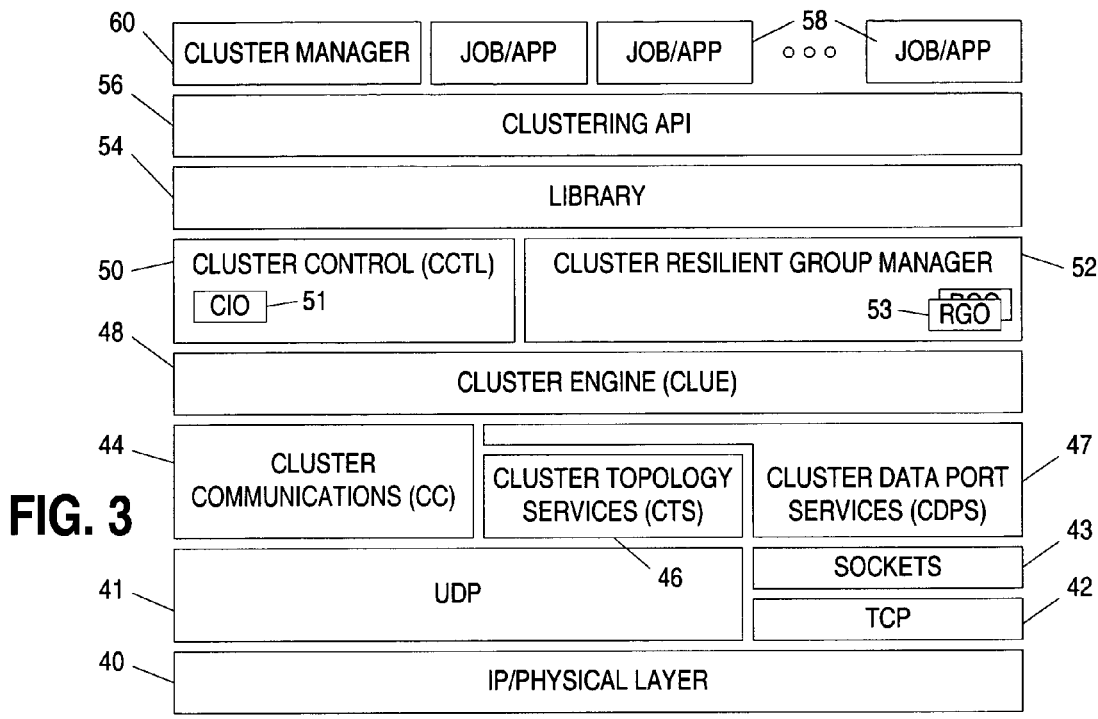
FIG. 3 is a software layer diagram of the principal clustering software components utilized in the node of FIG. 2.

As shown in FIG. 3, the principal software components executed within each node 12 include an IP/physical layer component 40, a UDP component 41, a TCP component 42, a sockets component 43, a cluster communications (CC) component 44, a cluster topology services (CTS) component 46, a cluster data port services (CDPS) component 47, a cluster engine (CLUE) component 48, a cluster control (CCTL) component 50 (within which is resident a cluster information object (CIO) 51), a cluster resilient group manager component 52 (within which is resident one or more resilient group objects (RGOs) 53), a library component 54, a clustering API component 56, and a plurality of jobs/applications 58, including a cluster manager application 60.

Generally, IP/physical layer component 40 provides an industry standard communications stack and physical interface with a network. UDP and TCP components 41 and 42 provide the UDP and TCP packet transmission protocols, respectively, and sockets component 43 provides sockets support over TCP.

CC component 44 provides support for reliable multicast clustering communication services, while CTS component 46 monitors the network topology of a clustered computer system, and stores information such as the layout of nodes, the specifications of network interconnects between nodes, the geographical locations of nodes, and node status information. CDPS component 47 provides support for cluster data ports consistent with the invention, and is described in greater detail below.

CLUE component 48 provides a distributed ordered group messaging service. CCTL component 50 manages the configuration and activation of clustering on a node, typically supporting various cluster initialization and node management operations suitable for managing a clustered environment. A CIO 51 is replicated on each node of a cluster to provide a dynamic and consistent cluster registry where each node has a consistent and local copy of all necessary cluster setup and status information for the cluster. Cluster resilient group manager component 52 synchronously maintains copies of group membership status information across the cluster, which are stored in RGOs 53.

Library component 54 provides other support services for a cluster. Clustering API component 56 provides the external interface to the underlying clustering functionality via jobs/applications 58. Cluster manager application 60 that provides the user interface whereby a user such as a systems administrator can manage clustering operations in the system.

In the illustrated embodiment, jobs/applications 58 are resident within the operating system and/or kernel of a node, while user-level applications and jobs are not permitted to access the cluster data port services directly. In other embodiments, however, user-level applications and jobs may be permitted to access cluster data port services consistent with the invention.

The discussion hereinafter will focus on the specific routines and data structures utilized to implement the above-described cluster data port services. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIGS. 1-3 is not intended to limit the present invention. Indeed, those skilled in the art will recognize that other alternative hardware and/or software environments may be used without departing from the scope of the invention.

A specific implementation of cluster data port services utilized in the clustered computer system described above in connection with FIGS. 1-3 is further illustrated in FIGS. 4-11. This implementation may be used, for example, to provide a clustering service to transfer large volumes of data between a source node and one of N specified target nodes in a clustering environment. In this implementation, a target node is considered switchable, depending on its availability in the cluster, and may also be remote (i.e., kilometers vs. meters from the source node).

As noted above, conventional clustering environments often rely on application or operating system code to control a single logical or TCP connection to a target node to handle the traffic in total. Unavailability of the target node requires the source node application code to redirect its data flow by establishing a new logical or TCP connection to a new target node.

The cluster data port services described hereinafter, on the other hand, provide an abstracted transport service that encapsulates and manages the establishment of multiple logical or TCP connections to a designated target node with designated backup target nodes, which appears to the user (i.e., an operating system or kernel component) like a single data port or data pipe. Throughput is enhanced by data port services that enable workload balancing of traffic across multiple logical or TCP connections to a target node. Where a target node's availability becomes suspect as detected by cluster services or network services, thus indicating a potential inability of the source node to communicate with the target node, cluster data port services accommodate a switchover of the data flow to a backup target node under the same data port without operating system or application code involvement in communication layer protocols, or optionally without even notifying such node in some implementations.

The hereinafter-described cluster data port services may also be configured to provide synchronous and asynchronous caller send models, as well as support message encryption. As such, the herein-described services may be used to provide a general messaging service that allows a variety of operating system or kernel components to make use of the services in a clustered environment.

In the illustrated embodiment, each node in the clustered computer system is implemented as an eServer iSeries midrange computer from International Business Machines Corporation. The cluster data port services implemented therein may be used in such an environment to support remote mirroring of storage devices such as independent auxiliary storage pools (IASPs), referred to herein as remote IASP support. With remote IASP support, an administrator may be permitted to configure an IASP on a remote system that is to be a logical mirror of an IASP on a local system (the former of which may be referred to as a copy disk, and the latter of which may be referred to as a production disk). The IASP is initially copied remotely and then kept in sync optionally via synchronous or asynchronous mirroring operations. Systems are remote to provide site disaster protection.

Cluster data port services as described herein may be used to support the transfer of mirroring data between an IASP on a local system (source node) and one or more IASPs on remote systems (target nodes). In addition, the IASPs may be configured as switchable DASDs between multiple nodes. As part of a typical mirroring topology, for example, multiple source nodes may "share" a switchable DASD for backup, while multiple target nodes may likewise share another switchable DASD that functions as a mirroring target.

As noted above, the cluster port data services are available to operating system or kernel users only, e.g., components resident in the system licensed internal code (SLIC) of an iSeries computer. Such users are typically required to register a component unique client name and an associated set of callback functions (which reference the client name) on each cluster node desired to serve as a source or target destination. Registration may need to be deferred until the cluster is operational.

In the illustrated implementation, user send requests are load balanced by the cluster data port services across available defined IP address paths to the currently specified target node. The user is typically responsible to provide and persist any destination node ID and IP address information defining desired data transmission paths. The user may also control suspension of traffic and redirection of data paths to a new destination node if desired. Notifications flow back to the user via the user provided callback functions.

While the cluster data port services are typically optimized for high throughput traffic flow from source to target, a single data port instance may also support target to source message sends, and as such, caller traffic need not be confined to unidirectional traffic from source to target.

The cluster data port services may rely on sockets asynchronous I/O completion ports (IOCPs) to minimize the number of tasks required to support the service, given the potential for multiple logical or TCP connections being established between nodes. The services may also provide the structure to support asynchronous sends, receive callbacks, and improve efficiency for load balancing sends across multiple TCP connections. Enhanced socket support coupled with cluster data port services may also insure that ordered message delivery is maintained in spite of load balanced messaging across multiple connections simultaneously.

Flow control may be handled by a sockets layer such that the caller is not required to perform retries. The caller is, however, typically required to ensure that unlimited sends do not occur during flow control enabled periods. Some monitor/throttle capability desirably is provided on the caller side. The caller may optionally request notification of flow control status changes, e.g., by setting a flow control attribute flag. Notification may be made via caller provided flow control callback. A caller may use this notification to start/stop resource monitoring to ensure unlimited sends do not occur when flow control is enabled. With this model, sends are typically not rejected back to the caller, but are queued, and eventually handled by the layers below. This implies data port level buffering during traffic suspension for "switchover" of destination nodes to give a consistent look to the flow control mechanism.

Multiple tasks may attempt connects and sends to a common data port handle. The connects may be use counted to ensure all tasks are finished with the data port when closing (i.e, a duplicate connect will bump the use count, thereby requiring multiple closes if doing controlled closes). The sends from multiple tasks may be ordered only with respect to the individual sending tasks upon delivery on the target node.

The cluster data port and socket services on a target node typically insure ordered message delivery with respect to single sending tasks. Caller level asynchronous send and synchronous send models may be supported.

In the illustrated implementation, the interface for SLIC components or users is desirably provided as method calls on a cluster data port object that the user is considered to "own." The object may be constructed on a register call, and destructed on an unregister call.

It is desirable for the herein-described cluster data port services implementation to provide the following capabilities: a high-throughput reliable ordered messaging service (e.g., a throughput of at least 1 GB per minute for an IP connection); load balancing across multiple (e.g., 4 or more) connection paths to a target node; support for multiple target nodes under single data port instance, allowing a user to "switch over" a destination node, only one of which is active at a time; synchronous and asynchronous send models; flow control notification; error notification for cluster events on source/target nodes and data port connection paths; message encryption; concurrent send task support; and bi-directional message flow. It will be appreciated, however, that different capabilities and combinations of functions may be supported in different implementations of cluster data port services consistent with the invention.

Figure 4:
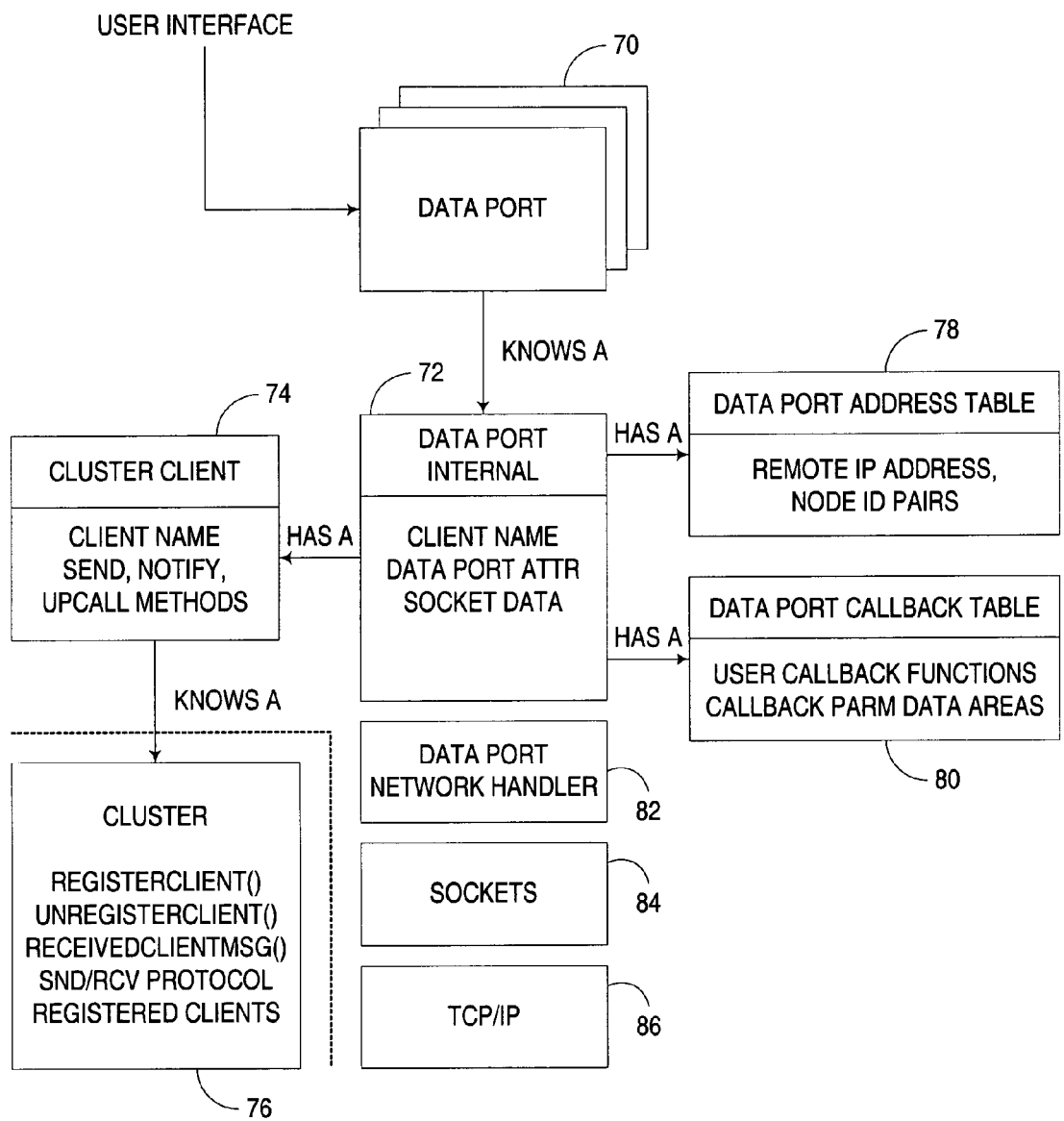
FIG. 4 is an object diagram of the principal objects in the cluster data port services referenced in FIG. 3.

Now turning to FIG. 4, an object diagram of the principal objects in the cluster data port services implementation discussed herein, is further illustrated. In particular, a data port object or instance 70 is created via a user interface by a SLIC component or other user application whenever it is desired to communicate data between a source node and a target node using cluster data port services. A data port internal object 72 is created by, and is known by, a data port object 70, and includes information such as client names, data port attributes and socket data. Object 72 is typically created during the creation of an associated data port object 70, with the created data port object 70 including a handle to the data port internal object 72. It is also within data port internal object 72 that failover of a node may be implemented.

Data port internal object 72 has a cluster client object 74, which stores information such as a client name, as well as various callback methods such as send, notify and upcall methods, which may be used to communicate with the client. Cluster client object 74 is additionally registered with the clustering infrastructure, and as a result includes a handle to a cluster object 76. Cluster object 76 includes various methods and data, such as registerclient( ), unregisterclient( ), and receivedclientmsg( ) methods, as well as a send/receive protocol and a list of registered clients. It is through the interaction between objects 74 and 76 that the data port is tied into the clustering environment. By doing so, activities such as notifying the data port of the failure of a node, communication link, cluster process (job), etc., may be initiated via these objects.

Data port internal object 72 also has a data port address table 78, which stores remote IP address, node ID pairs relating to the available IP addresses through which a particular node (identified by the node ID) is coupled to the clustering network. In addition, data port internal object 72 also has a data port callback table 80 that identifies the user callback functions, and parameter data areas therefor, for various functions that may be registered with the data port by the user to be called when various events occur on the data port. For example, a user may desire to be notified whenever a data transmission error occurs. By registering an appropriate callback method on the user, the occurrence of a data error may result in execution of the callback function to notify the user of the error.

Additional objects and services utilized by the cluster data port services include a data port network handler 82, sockets component 84, and TCP/IP stack 86. Network handler 82 provides the network interface for a data port, and may additionally implement various functions such as load balancing between multiple IP addresses, as well as re-sending data after a node failover. Sockets component 84 and TCP/IP stack 86 handle sockets and TCP/IP communication, respectively.

It will be appreciated that alternate object architectures may be utilized for cluster data port services consistent with the invention.

Figure 5:
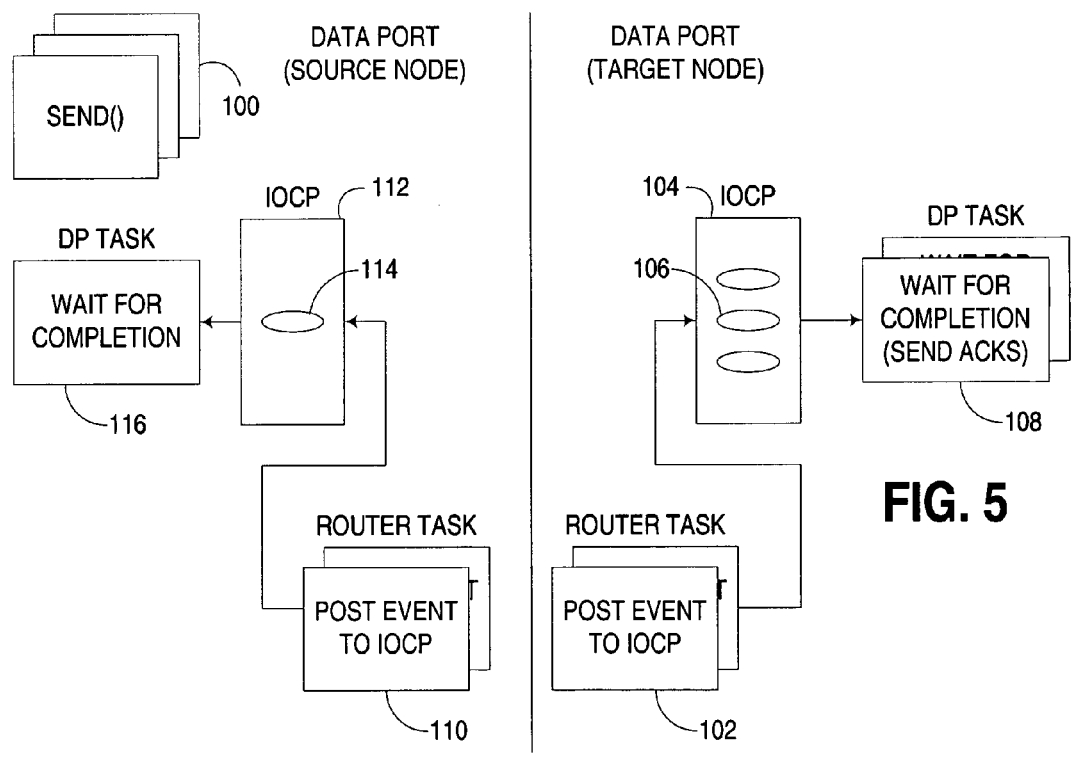
FIG. 5 is an block diagram of a tasking model utilized in the cluster data port services referenced in FIG. 3.

Next, FIG. 5 illustrates a tasking model utilized in the cluster port data services described herein. FIG. 5, in particular, illustrates the tasks executing on both a source node and a target node to implement the data port functionality described herein. From a source node side, a plurality of user tasks 100 may be supported to send data to be transmitted over a data port. It will be appreciated that a user can send data for multiple tasks. Flow controlled sends, initiated by tasks 100, are sent under router tasks (not shown in FIG. 5) by the TCP/IP stack.

From the target node side, the send messages sent from a source are received by a router task 102, which posts events to an I/O completion port (IOCP) queue 104 in the sockets. Such events are diagrammatically illustrated at 106, and are processed by one or more data port tasks 108 which are configured to wait for I/O or "record" completions. Tasks 108 may also send acknowledgments, if appropriate, again utilizing flow controlled send messages under router tasks by a TCP stack in the target node (not shown in FIG. 5). Such acknowledgments, as well as any send data sent from a target node to a source node, are received by a router task 110 in the source node. A complementary IOCP queue 112 in the source node is used to receive events 114 posted by task 110. A data port task 116 processes such events as they are received on the queue. Moreover, typically in response to an acknowledgment to a previous send, task 116 will also execute a callback routine to the user task to notify the user task of completion of the sent message.

Figure 6:
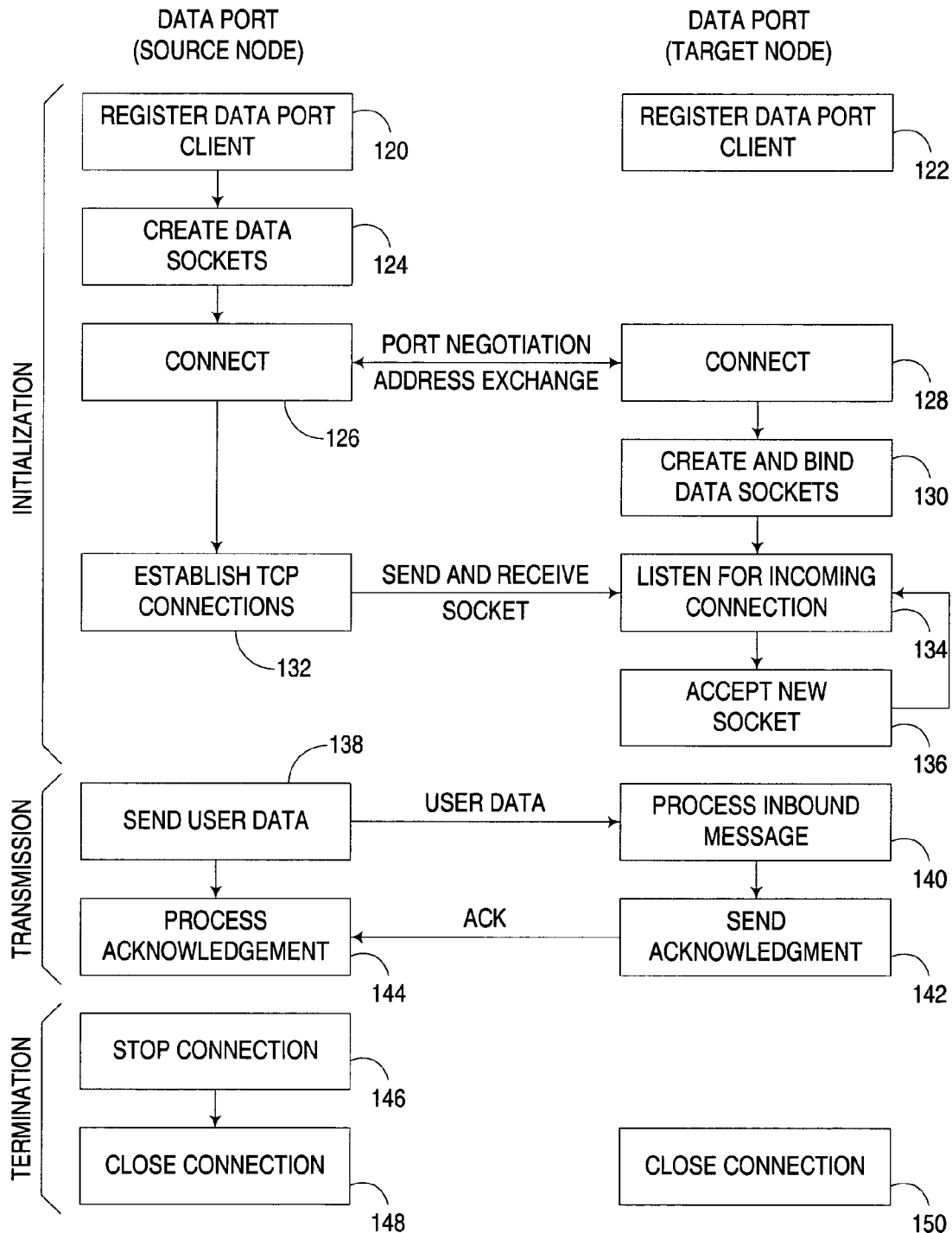
FIG. 6 is a flowchart illustrating the coordinated program flow for initializing, transmitting with, and terminating the cluster data port services referenced in FIG. 3.

FIG. 6 next illustrates the coordinated flow between source and target nodes in initializing, transmitting data over, and terminating a cluster data port consistent with the invention. As shown for example at blocks 120 and 122, typically a client (or user) is registered with a data port asynchronously upon each of the source and target nodes. Sometime thereafter, one or more data sockets are created on the source node in block 124. Next, when it is desirable to establish a connection between the source and target nodes, a cluster messaging protocol is performed in blocks 126 and 128, with port negotiation and address exchange performed between the nodes. Next, in block 130, the target node creates and binds the data sockets on the target node. Logical or TCP connections are then established in block 132 by communicating one or more send and receive sockets from the source node to the target node. The target node listens for incoming connections in block 134. As each send and receive socket is communicated by the source node, the new socket is accepted in block 136, whereby control returns to block 134 to listen for additional incoming connections. Once all TCP connections have been passed to the target node by the source node, one or more connection paths are established between the source and target nodes. As will be described below, if multiple connection paths are established between the source and target nodes, a load balancing algorithm may be utilized in the source node to distribute message traffic between the multiple connection paths.

Sometime thereafter, whenever it is desirable to send user data from the source node to the target node, the source node executes a send user data block 138, which passes user data to the target node in the form of a message. This inbound message is processed in block 140 as appropriate, and typically results in the transmission of an acknowledgment (ACK) in block 142. The acknowledgment transmitted by the target node is returned to the source node and processed in block 144. Generally, each message that is transmitted by the source node to the target node is handled in a similar manner, as shown in connection with blocks 138-144.

To implement a termination of a data port, a source node may issue a stop connection command in block 146 which halts, from the perspective of the source node, further communication over the data port. The data port remains active, however, until the source node closes the connection in block 148. Likewise, a target node may independently close a connection, as shown in block 150.

Figure 7:
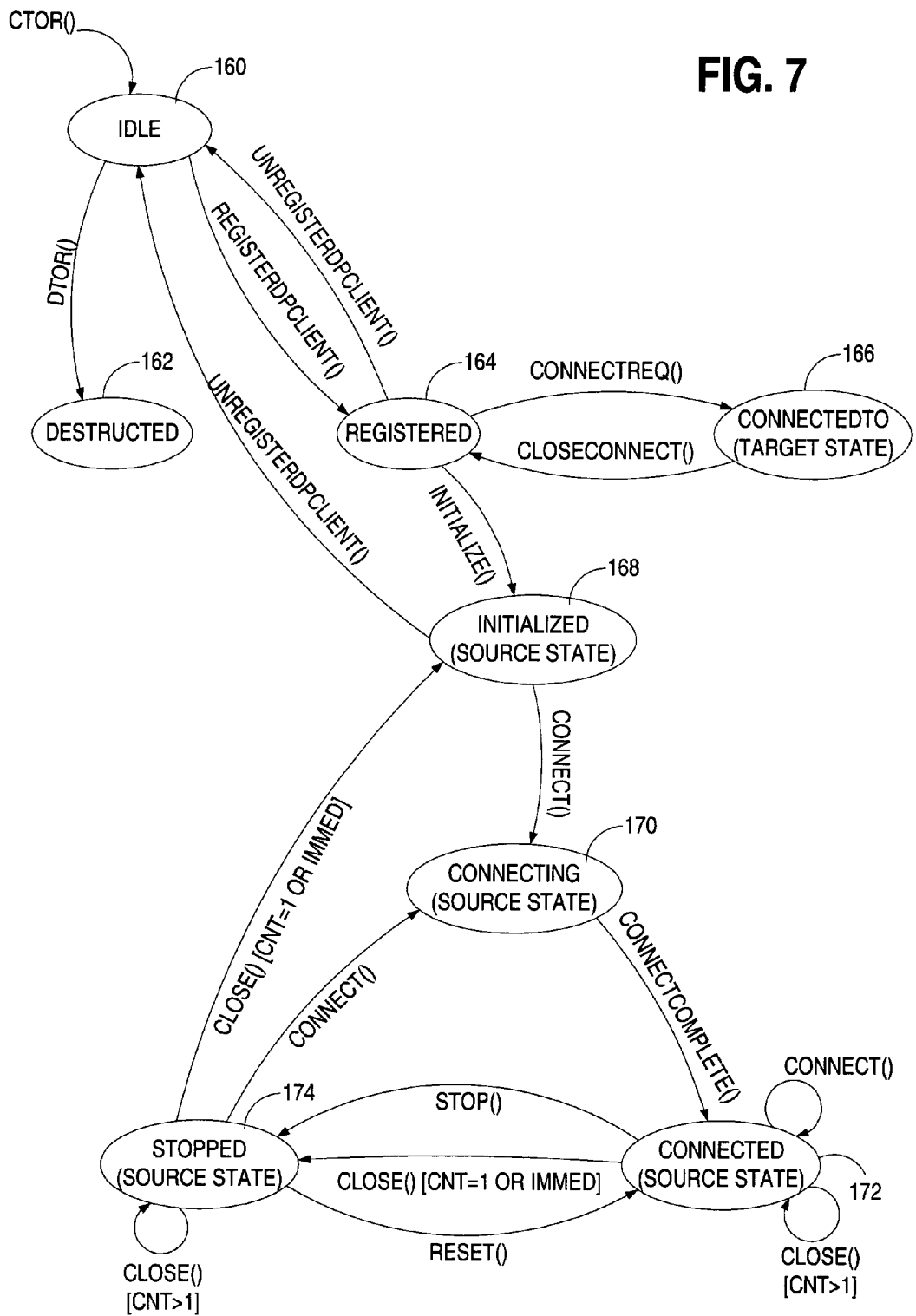
FIG. 7 is a state diagram for the cluster data port services referenced in FIG. 3.

FIG. 7 next illustrates one suitable state diagram for use in cluster data port services consistent with the invention. The state diagram in many respects follows the sequence of operations discussed above in connection with FIG. 6. Also illustrated in the figure are a number of user application interfaces that may be supported by cluster data port services consistent with the invention. It will be appreciated, however, that a wide variety of other interfaces may be supported consistent with the invention.

As shown in FIG. 7, a data port initially enters an IDLE state 160 in response to creation of the data port, e.g., via a constructor method (ctor( )) executed during creation of a data port object. During creation, a creator may specify parameters such as IP addresses to be associated with the data port, a list of primary and backup target nodes, and a backup order or algorithm. Destruction of the data port object, e.g., via calling a destructor method (dtor( )), transitions the data port to a DESTRUCTED state 162, whereby the data port is ultimately collected by the system.

The data port is transitioned from IDLE state 160 to a REGISTERED state 164 in response to a registerdpclient( ) method, which is utilized to register a user with a data port. As noted above, in connection with registering with a data port, a client may provide information such as a list of callback methods that may be invoked to receive events from the data port. Other manners of notifying a client of the activities of a data port may be used in the alternative.

From the perspective of a target node, a data port may transition to a CONNECTEDTO state 166 in response to a connectreq( ) method that is executed when a source node attempts to connect to the target node. If the connection is closed, a closeconnect( ) method may be called to return the data port to the REGISTERED state 164.

From the perspective of a source node, the node transitions from the REGISTERED state 164 to an INITIALIZED state 168 in response to an initialize( ) method. The initialize( ) method may be used, for example, to set up address tables in a created data port instance. Once initialized, the data port transitions from state 168 to CONNECTING state 170 in response to a connect( ) method that initiates the aforementioned cluster messaging protocol to exchange sockets between the source and target nodes. Once the connection process is complete, a connectcompleteo method is called, transitioning the data port to a CONNECTED state 172. Once in the CONNECTED state, additional connections may be initiated, e.g., to permit multiple user tasks to utilize the data port. Such additional connection requests, however, do not result in the transition of the data port from state 172. In addition, when in the CONNECTED state, the data port is configured to receive and send messages in the manner described herein.

A data port may transition from the CONNECTED state to a STOPPED state 174 in a number of different manners. For example, an explicit stop( ) method may be called to transition to state 174. On the other hand, connections may be closed using a close( ) method. If multiple connections are active (i.e., CNT>1), the close( ) method will not result in a transition out of state 172. However, if a closed( ) method is called with only one connection existing, or if an immediate closing of the data port is requested, a transition will occur to STOPPED state 174. The data port may also transition from state 174 back to state 172 in response to a reset( ) method. Otherwise, the data port may transition back to CONNECTING state 170 if a new connect( ) method is called on the data port when in state 174. Moreover, if an attempt is made to close the data port using a close( ) method, and where the number of connections is one, or an immediate close is specified, a transition back to INTIALIZED state 168 is made. Otherwise, if a close( ) method is called when in STOPPED state 174, but the number of connections is greater than one, the data port remains in state 174.

It should be appreciated that data may be communicated between source and target nodes in a cluster data port via the use of messages, or via other data formats. Moreover, the messages communicated between a source node and a target node may take any number of different forms, and may include, for example, pre-defined headers that define the format of such messages. Where message reordering is possible in a given communications scenario, it may be desirable, for example, to include sequence numbers within the message headers to ensure that such messages may be reconstituted at a target node. One suitable header format and sequencing protocol is described, for example, in U.S. patent application Ser. No. 10/422,680, filed Apr. 24, 2003 by Timothy R. Block et al., which is assigned to the Assignee of the present invention, and which is incorporated by reference herein.

The transmission of a message from a source node to a target node is further illustrated by a send message routine 180 in FIG. 8. Routine 180 executes on a source node data port, or may be executed by a target node data port should the target node communicate data to a source node.

Routine 180 begins in block 182 by selecting a connection path using a load balancing algorithm, if multiple such connection paths have been established between the source and target nodes. Various load balancing algorithms may be utilized, e.g., a round robin selection of connection paths, or in the alternative, alternative load balancing algorithms such as having sockets contact the data port when a connection path has no work to do and using that connection path for the next transmission. Other load balancing algorithms known in the art may also be used in the alternative.

Once a connection path is selected, the message is then passed to the selected connection path for transmission in block 184. Thereafter, control passes to block 186 to determine if an acknowledgment has been received from the target node. If so, control passes to block 188, whereby transmission of the message is complete. In addition, an "OK" status may be returned to the user.

Returning to block 186, if no acknowledgment has yet been received, control passes to block 190 to determine whether the message has timed out, i.e., an acknowledgment has not been received in the predetermined period of time. If the message has not yet timed out, block 190 returns control to block 186. However, if no acknowledgment has been received within a predetermined period of time, block 190 passes control to block 192 to determine whether an "autoswitch" mode is enabled.

Autoswitch refers to the capability to automatically failover to a backup node upon detection of a failure in a target node, without specific initiation by a client or user. As such, if autoswitch mode is not enabled, block 192 passes control to block 194 to terminate routine 180 and to return a "FAIL" status to a client. In such instances, it is typically incumbent for the client to initiate the failover to a backup node.

If, on the other hand, autoswitch mode is enabled, block 192 passes control to block 196 to determine whether another backup node is available. If no such backup node is available, control passes to block 194, terminating routine 180 with a "FAIL" status. Otherwise, control passes to block 198 to initiate a connection sequence to connect the source node to a backup target node, e.g., using the same protocol discussed above in connection with FIG. 6. Once the connection sequence is complete, control passes to block 182 to select a new connection path from those established for the new target node using the aforementioned load balancing algorithm. Transmission of the message using the selected connection path then proceeds in the manner describe above.

It will be appreciated that, in some implementations consistent with the invention, block 192 may be omitted. In some of such implementations, automated failover may always require user initiation, while in other implementations, the automated failover may occur in a manner that is effectively hidden from the user.

As noted above, both synchronous and asynchronous messaging formats may be supported. FIG. 9, for example, illustrates the normal send message flow that may occur in a synchronous mode when transmitting between a source node and a target node. Within each node, the function calls made by each of a user, data port, and socket are illustrated. The flow illustrated in FIG. 9 is synchronous from the standpoint that the user on the target side sends acknowledgments, which may be advantageous for storage management applications where synchronous messaging is desired. It should be noted, however, that from the perspective of a data port, the messaging is not synchronous in nature.

As shown in FIG. 9, initiation of the communication of an exemplary message M1 from the source node to the target node occurs via a send (M1) call from the user to the data port on the source node. As a result of this call, the data port passes a startsend(M1) call to the socket on the source node. Thereafter, the data port returns a "SUCCESS" status to the user, indicating the message has been sent.

In addition, at sometime prior, the data port on the target node has initialized the socket to receive communications from the source node, via startrecv( ) and waitforcmpt( ) calls to the socket.

Sometime thereafter, message M1 is transmitted between the sockets on the source and target nodes. Upon receipt of the message, the socket reports to the data port of the target node that the record is complete (i.e., the message has been received and stored in a record of an IOCP queue). The data port notifies the user on the target node that such data has been received via a callback function rcvddata(M1,SN), where SN is the sequence number of the message. The user then processes the received message, and initiates the communication of an acknowledgment to the source node via a sendack(SN, RC) call to the data port, with RC storing a return code appropriate for the message. The data port then initiates the transmission of an acknowledgment A1 to the source node via a startsend(A1) call. The data port also returns a "SUCCESS" status to the target node user. Thereafter, the sockets on the source and target nodes cooperate to transmit the acknowledgment to the source node. In addition, prior to such transmission, the data port on the source node has initialized the socket to receive an acknowledgment via startrecv( ) and waitforcmpt( ) calls to the socket.

Once the acknowledgment is received by the socket, the socket notifies the data port that N acknowledgments have been received (to account for the possibility that multiple acknowledgments may be received). In response to such notification, the data port issues a callback function to the user to free the buffer allocated for the message M1, and to forward the return code RC generated by the target node.

In an asynchronous mode, a similar flow occurs, however, the data port on the target node sends an acknowledgment to the source node upon notification of a "RECORD COMPLETE" status from the socket, rather than requiring the user to initiate the transmission of an acknowledgment. In still another alternative mode, an acknowledgment may be sent to a source node user once transmission of a message is complete.

Figure 10:
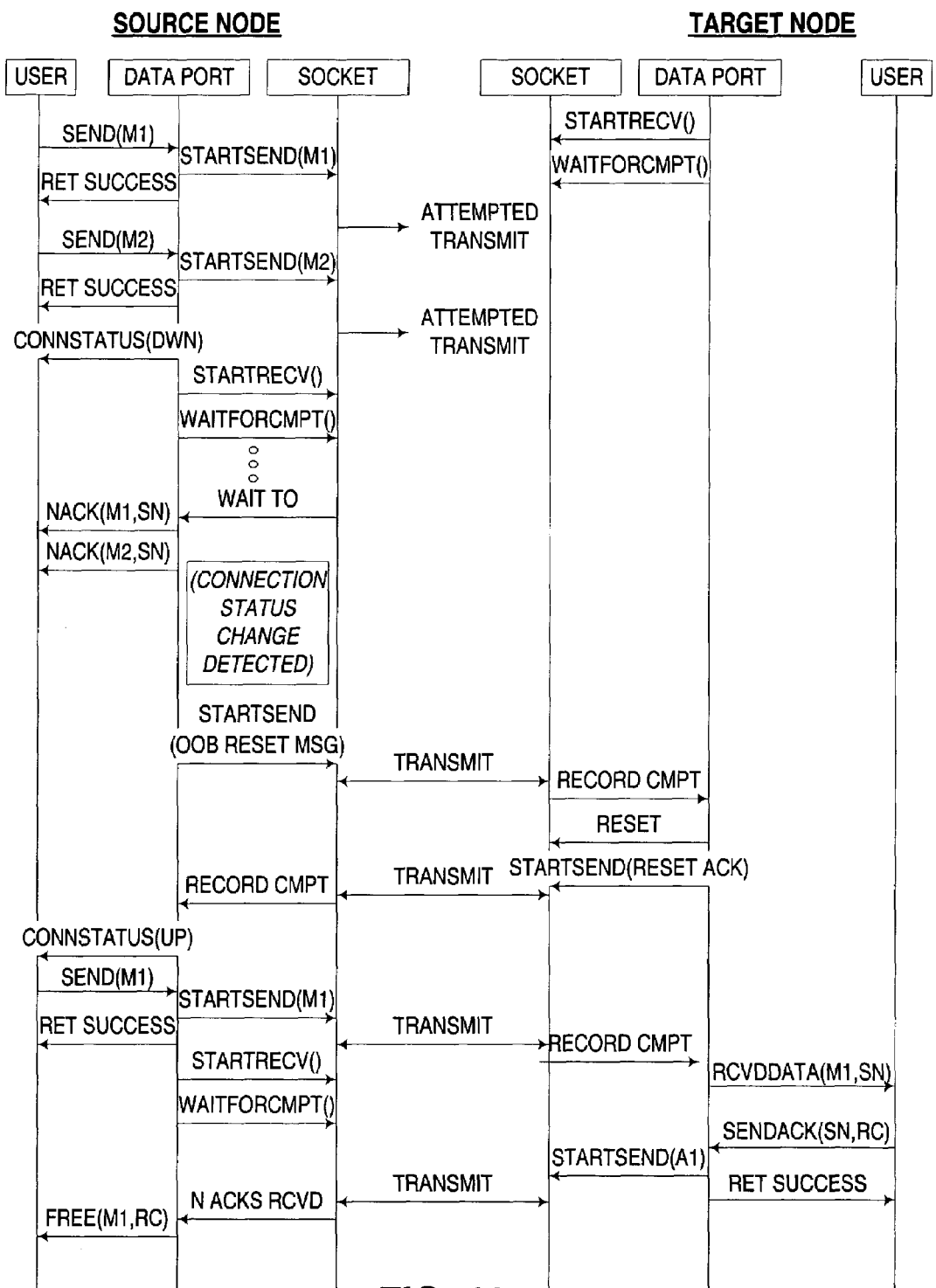
FIG. 10 is a flowchart illustrating message timeout flow resulting from a network failure in the cluster data port services referenced in FIG. 3, and resulting in a source node-initiated reset on a target node.

FIG. 10 next illustrates an exemplary message timeout flow resulting from a network failure in the clustered data port services, and which results in a source node-initiated reset on a target node. In particular, FIG. 10 illustrates a user attempting to send two messages, M1 and M2, but resulting in a wait timeout being reported by the source node socket after no acknowledgment is received in an appropriate period of time. As a result of this timeout, the data port on the source node reports a non-acknowledgment for each of messages M1 and M2 back to the user on the source node via nack( ) calls to the user. In addition, prior to sending the non-acknowledgments, the data port on the source node makes a connstatus(dwn) call to the user to notify the user or client that all subsequent sends will be immediately failed back, and that all prior sends will eventually be non-acknowledged. No further sends are then accepted until after receipt of a connection "up" status.

Sometime thereafter, a connection status change is detected by the source node. To recover the connection to the target node, a startsend(OOB reset msg) call is made by the data port to the socket, resulting in the transmission of a reset message to the target node. As a result of this message, the socket on the target node reports to the data node the reception of a complete record on the IOCP queue. The data port on the target node, detecting a reset message in the received record, issues a reset to the socket of the target node, and then initiates the transmission of a reset acknowledgment via a startsend (reset ACK) call to the socket. The socket thereafter transmits the reset acknowledgment to the source node, which results in the reception of the acknowledgment reported to the data port via a "RECORD COMPLETE" indication by the socket in the source node. The data port then reports that the connection step has now been re-established via a connstatus(up) call to the user. With the connection re-established, the user then initiates a resend of message M1, which is handled successfully in the manner described above in connection with FIG. 9. Note that the re-transmission of message M2 occurs in a similar manner, but is not shown separately in FIG. 10.

Figure 11:
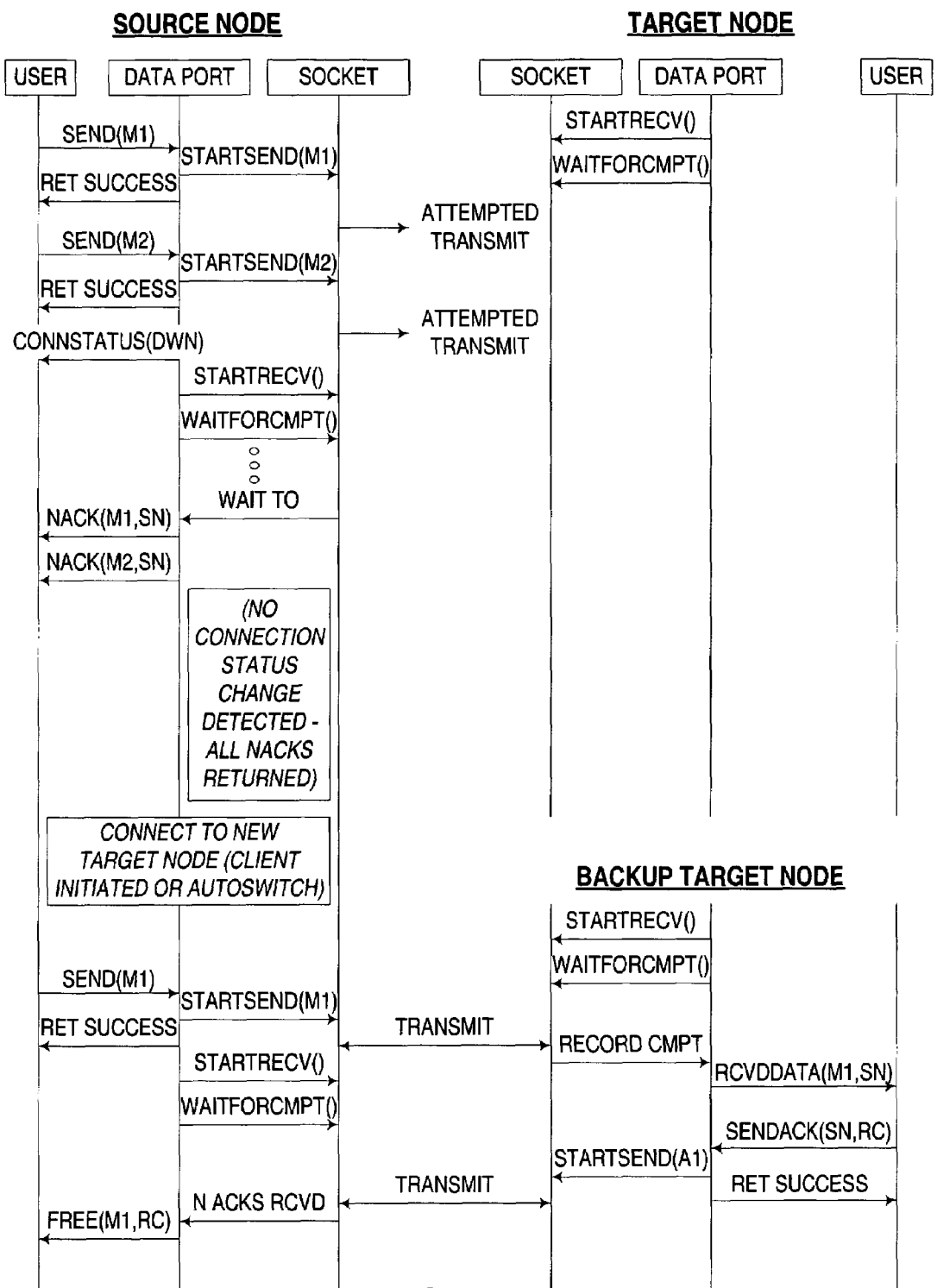
FIG. 11 is a flowchart illustrating message timeout flow resulting from a network failure in the cluster data port services referenced in FIG. 3, and resulting in a source node-initiated failover to a backup target node.

FIG. 11 next illustrates a message timeout flow resulting from a network failure in the cluster data port services, and resulting in a source node-initiated failover to a backup target node. As with the flow of FIG. 10, attempts are made by the source node to send messages M1 and M2, and after a timeout due to failed attempts to transmit, non-acknowledgment calls are made to the user by the data port. Thereafter, assuming that no connection status change is detected, and all non-acknowledgments have been returned, the source node may initiate a connection to a new target node. As described above in connection with FIG. 8, such connection may be initiated by the user or client, e.g., after notifying the user that the target node has failed, or alternatively, via autoswitch where the failover is initiated in the data port itself. Once the new connection to the replacement target node is made, messages M1 and M2 are re-sent, but are transmitted to the backup target node, rather than the original primary target.

It will be appreciated that different message flows may be utilized in different embodiments consistent with the invention. Moreover, it will be appreciated that implementation of the aforementioned cluster data port services functionality in a cluster infrastructure would be well within the ability of one of ordinary skill in the art having the benefit of the instant disclosure.

Various additional modifications may be made to the herein-described embodiments without departing from the spirit and scope of the invention. Therefore, the invention lies in the claims hereinafter appended.

What is calimed is:

1. A method of communicating between a source and a target node in a clustered computer system, the method comprising:
    establishing a cluster data port between the source node and a target node, the cluster data port configured to select among a plurality of connection paths between the source node and the target node, and to selectively switch over data flow from the target node to a backup target node, wherein establishing the cluster data port includes establishing multiple concurrent loaical connections between the source node and the target node, each loaical connection configured to communicate data over a connection path among the plurality of connection paths; and
    communicating data from the source node to the target node using the cluster data port.

2. The method of claim 1, wherein establishing the cluster data port includes exchanging between the source and target nodes network addresses associated with at least one of the source and target nodes.

3. The method of claim 1, wherein establishing the cluster data port includes registering a client that is resident on the source node with the cluster data port.

4. The method of claim 3, wherein registering the client comprises identifying to the data cluster port at least one callback function associated with the client, wherein the cluster data port is configured to notify the client of a data port event by calling the callback function.

5. The method of claim 1, wherein communicating data from the source node to the target node includes performing load balancing in the cluster data port to distribute the data among the plurality of connection paths.

6. The method of claim 1 wherein each logical connection path comprises a TCP connection.

7. The method of claim 1, wherein the cluster data port is configured to communicate data between the source and target nodes according to a messaging protocol selected from the group consisting of an asynchronous messaging protocol and a synchronous messaging protocol.

8. The method of claim 1, further comprising, with the cluster data port, switching data flow from the target node to a backup target node in response to an inability to communicate with the target node.

9. The method of claim 8, wherein switching data flow from the target node to the backup target node includes establishing a logical connection between the source node and the backup target node.

10. The method of claim 8, further comprising notifying a client of the cluster data port service of the inability to communicate with the target node, wherein switching data flow from the target node to a backup node is performed in response to initiation of a cluster data port failover by the client.

11. The method of claim 8, wherein switching data flow from the target node to a backup node is initiated by the cluster data port.

12. The method of claim 1, further comprising, with the cluster data port, resetting a logical connection between the source node and the target node in response to an inability to communicate with the target node.

13. The method of claim 1, further comprising communicating data from the target node to the source node using the cluster data port.

14. The method of claim 1, wherein the target node is remote from the source node, and wherein communicating data from the source node to the target node includes communicating mirror data to support remote mirroring between the source and target nodes.

15. An apparatus, comprising:
a memory;
at least one processor; and
program code resident in the memory and configured for execution on the at least one processor to implement a cluster data port for a clustered computer system of the type including a plurality of nodes, the cluster data port configured to support communication between a source node and a target node among the plurality of nodes, the cluster data port further configured to select among a plurality of connection paths between the source node and the target node, and to selectively switch over data flow from the target node to a backup target nodes wherein the cluster data port is configured to establish multiple concurrent logical connections between the source node and the target node, each logical connection configured to communicate data over a connection path among the plurality of connection paths.

16. The apparatus of claim 15, wherein the cluster data port is configured to exchange between the source and target nodes network addresses associated with at least one of the source and target nodes.

17. The apparatus of claim 15, wherein the cluster data port is configured to register a client that is resident on the source node.

18. The apparatus of claim 17, wherein the cluster data port is configured to receive from the client at least one callback function associated with the client during registration of the client, wherein the cluster data port is configured to notify the client of a data port event by calling the callback function.

19. The apparatus of claim 15, wherein the cluster data port is configured to load balance data communicated between the source and target nodes to distribute the data among the plurality of connection paths.

20. The apparatus of claim 15, wherein each logical connection path comprises a TCP connection.

21. The apparatus of claim 15, wherein the cluster data port is configured to communicate data between the source and target nodes according to a messaging protocol selected from the group consisting of an asynchronous messaging protocol and a synchronous messaging protocol.

22. The apparatus of claim 15, wherein the cluster data port is configured to switch data flow from the target node to a backup target node in response to an inability to communicate with the target node.

23. The apparatus of claim 22, wherein the cluster data port is configured to switch data flow from the target node to the backup target node by establishing a logical connection between the source node and the backup target node.

24. The apparatus of claim 22, wherein the cluster data port is further configured to notify a client of the cluster data port of the inability to communicate with the target node, and wherein the cluster data port is configured to switch data flow from the target node to a backup node in response to initiation of a cluster data port failover by the client.

25. The apparatus of claim 22, wherein the cluster data port is configured to initiate the switch of data flow from the target node to a backup node.

26. The apparatus of claim 15, wherein the cluster data port is configured to reset a logical connection between the source node and the target node in response to an inability to communicate with the target node.

27. The apparatus of claim 15, wherein the cluster data port is configured to support bidirectional communication between the source and target nodes.

28. The apparatus of claim 15, wherein the target node is remote from the source node, and wherein the cluster data port is configured to communicate mirror data from the source node to the target node to support remote mirroring between the source and target nodes.

29. A clustered computer system, comprising:
a plurality of nodes; and
a cluster data port resident on at least one of the plurality of nodes and configured to support communication between a source node and a target node among the plurality of nodes, the cluster data port configured to select among a plurality of connection paths between the source node and the target node, and to selectively switch over data flow from the target node to a backup target nodes wherein the cluster data port is confiaured to establish multiple concurrent loaical connections between the source node and the taraet node. each loaical connection configured to communicate data over a connection path amona the plurality of connection paths.

30. The clustered computer system of claim 29, wherein the cluster data port is configured to select among the plurality of connection paths using a load balancing algorithm.

31. The clustered computer system of claim 29, wherein the cluster data port is configured to switch over data flow from the target node to the backup target node in response to an inability of the source node to communicate with the target node.

32. The clustered computer system of claim 29, wherein the target node is remote from the source node, and wherein the cluster data port is configured to communicate mirror data from the source node to the target node to support remote mirroring between the source and target nodes.

33. A program product, comprising:
 program code configured to implement a cluster data port for a clustered computer system of the type including a plurality of nodes, the cluster data port configured to support communication between a source node and a target node among the plurality of nodes, the cluster data port further configured to select among a plurality of connection paths between the source node and the target node, and to selectively switch over data flow from the target node to a backup target node. wherein the cluster data port is configured to establish multiple concurrent logical connections between the source node and the target node. each logical connection configured to communicate data over a connection path among the plurality of connection paths; and
 a signal bearing medium bearing the program code.

34. The program product of claim 33, wherein the signal bearing medium includes at least one of a recordable and a transmission medium.

* * * * *